United States Patent [19]

Behrens et al.

[11] Patent Number: 4,899,137

[45] Date of Patent: Feb. 6, 1990

[54] ARRANGEMENT FOR THE INPUT AND PROCESSING OF CHARACTERS AND/OR GRAPHIC PATTERNS

[75] Inventors: Herbert Behrens, Neuenburg; Norbert Zeising, Oldenburg, both of Fed. Rep. of Germany

[73] Assignee: AEG Olympia Aktiengesellschaft, Wilhelmshaven, Fed. Rep. of Germany

[21] Appl. No.: 249,303

[22] Filed: Sep. 26, 1988

[30] Foreign Application Priority Data

Sep. 26, 1987 [DE] Fed. Rep. of Germany ....... 3732519

[51] Int. Cl.$^4$ .............................................. G06F 3/02
[52] U.S. Cl. ..................................... 340/711; 178/18; 341/5
[58] Field of Search ...................... 340/711, 712, 706; 341/34; 178/18, 19

[56] References Cited

U.S. PATENT DOCUMENTS 4,326,193  4/1982  Markley et al. .................... 340/711

Primary Examiner—Stafford D. Schreyer
Attorney, Agent, or Firm—Spencer & Frank

[57] ABSTRACT

An apparatus for the input and processing of characters and/or graphic patterns for use with electronic data processing systems includes an input unit and a control unit which transmits the input characters and/or graphic patterns to an output unit, a graphics tablet having an input layer, a plurality of sensor elements disposed on the input layer for converting pressure signals into electrical signals which are adapted for transmission to the control unit, a keyboard which is movable relative to the input layer from a keyboard operating position adjacent to the input layer to expose the input layer to enable direct entry thereto, and an operating mode detector for detecting whether the keyboard is in the operating position.

18 Claims, 2 Drawing Sheets

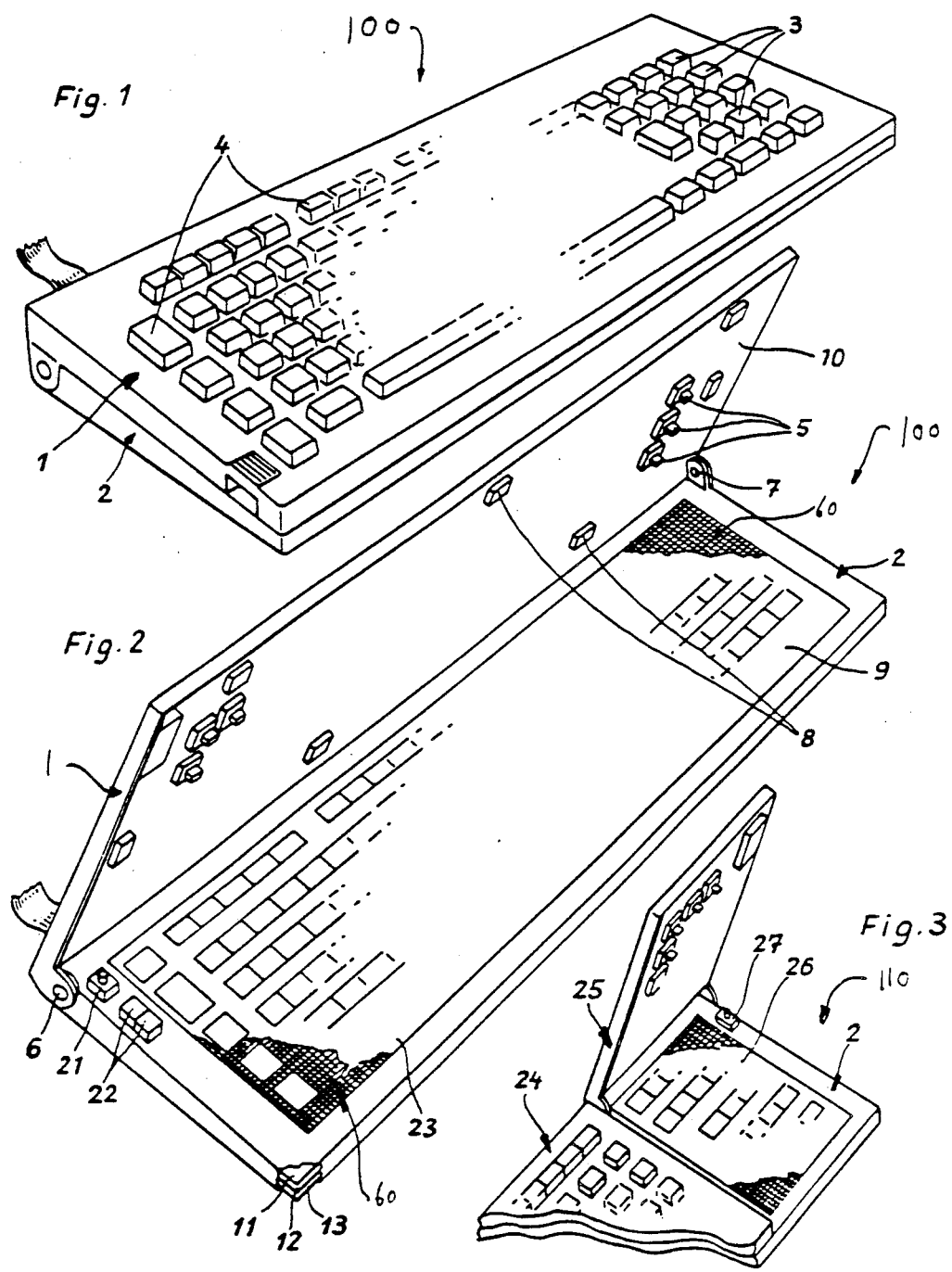

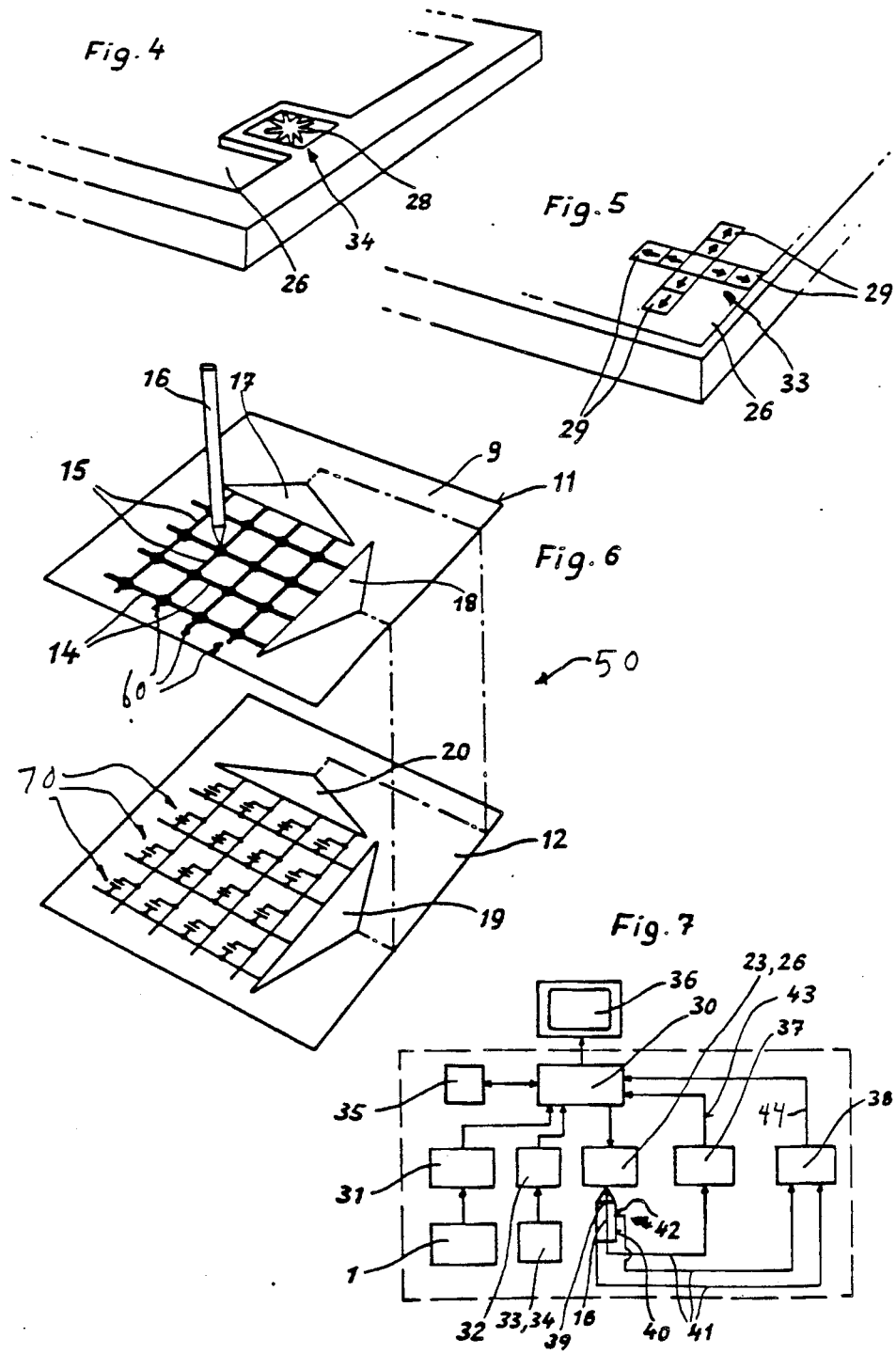

ARRANGEMENT FOR THE INPUT AND PROCESSING OF CHARACTERS AND/OR GRAPHIC PATTERNS

BACKGROUND OF THE INVENTION

The present invention relates to an arrangement for the input and processing of characters and/or graphic patterns for use with electronic data processing systems, including an input unit and a control unit which transmits the input characters and/or graphic patterns to an output unit.

In Federal Republic of Germany Pat. No. 2,517,555, an arrangement is disclosed for inputting characters to an electronic data processing device, including an input unit, an output unit and a control unit. The arrangement has a flat configuration, with the input unit and the output unit being disposed on the top side of the arrangement. The input unit is configured as a keyboard and the output unit is configured as a display which preferably accommodates as many character fields as can be accommodated in one line on a sheet of DIN A4 paper in portrait format. This known arrangement is suitable for the input of text as well as numbers and can be employed as a text station as well as a surface unit. This arrangement, however, cannot be operated by way of a conventional alpha-numeric keyboard having movable keys.

In Federal Republic of Germany Pat. No. 3,431,255, an electronic note-pad device is disclosed including an input unit for the input of handwritten data and a keyboard input unit. However, this device is not suitable as a terminal for comfortable office work stations.

A terminal having a key-operated screen to control a writing station is disclosed in Federal Republic of Germany Pat. No. 3,314,868. The writing station may here serve to record alpha-numeric data on an information carrier or for the input of data into a computer.

An alpha-numeric keyboard according to Federal Republic of Germany Pat. No. 3,340,370 is composed of an input field equipped with sensors and a connected microcomputer. Since no keys are available and manual input is intended, a keyboard can be made which is relatively small and economical to produce.

Additionally, European Pat. Application No. 0,112,972 discloses a data processing system in which characters are generated by use of an ASCII keyboard, and graphic symbols are generated by use of a separate graphics tablet. This results in an input unit having relatively large dimensions.

In U.S. Pat. No. 4,567,480 to Blanchard, a transparent touch-sensitive sheet is disclosed which overlies an optical display. An operator can interact with the optical display by contacting the touch-sensitive sheet. The optical display can be a CRT, a CCD, or an LED device.

In U.S. Pat. No. 4,353,552 to Pepper, Jr., a touch-sensitive panel is disclosed for interaction with a video display. The touch-sensitive panel has indicia thereon corresponding to that shown on the video display. The indicia on the touch-sensitive panel can be projected images which can be changed to represent different games.

In U.S. Pat. No. 4,622,437 to Bloom et al, a touch-sensitive panel is disclosed which has a panel having an electrode network thereon. The touch-sensitive panel is for use in a touch-responsive apparatus for determining the location of an object touching the touch-sensitive panel.

In U.S. Pat. No. 4,186,392 to Holz, an operating system is disclosed which includes a touch-sensitive panel having transparent electrodes. The touch-sensitive panel overlies a CRT display device. The operating system includes a driver for the touch-sensitive panel, a sense line multiplexer which receives signals from the transparent electrodes on the touch-sensitive panel, and a microprocessor.

SUMMARY OF THE INVENTION

It is an object of the present invention to provide an arrangement including an input unit, for the input and processing of characters as well as of graphic patterns, for use with electronic data processing systems, wherein a compact configuration of the input unit is ensured, and which is suitable for both the input of handwritten characters and/or graphic patterns, and for the input of numeric symbols by means of a conventional keyboard equipped with movable keys. This is accomplished by an arrangement for the input and processing of characters and/or graphic patterns for use with electronic data processing systems, the arrangement including an input unit and a control unit which transmits the input characters and/or graphic patterns to an output unit, including:

a graphics tablet having an input surface;

a plurality of sensor elements disposed on the input surface for converting pressure signals into electrical signals which are adapted for transmission to the control unit;

a keyboard which is movable relative to the input surface from a keyboard operating position adjacent to the input surface to expose the input surface to enable direct entry thereto; and an operating mode detector for detecting whether the keyboard is in the operating position.

The arrangement according to the invention has the advantage that it is very easily manipulated and has a compact structure. The sensor function of a conventional keyboard can be replaced by the tablet module according to the invention. A separate cursor control device, e.g. a mouse, is not necessary in the present invention since this function is likewise taken over by the tablet module. Additionally, it is possible to comfortably input alpha-numeric characters with a keyboard according to the invention which is usable in conjunction with the tablet module, the keyboard having movable keys. Use of the tablet module without the keyboard permits generation of handwritten characters and/or graphic patterns in a relatively simple manner by use of any suitable instrument, such as a wand or pen.

The universal utility of, and the relatively small dimensions of, the arrangement according to the invention are realized by providing the tablet module, which serves an input unit, with a sensor surface having a relatively large area and which is equipped with a relatively fine grid, and by providing a display surface in an output unit which is mechanically and electrically connected with a control unit (not shown) disposed thereunder. The control unit is preferably disposed, for example, at the bottom surface of the device, and may include one or more microcomputers, memories, electronic circuits, and batteries.

In a specific embodiment in which a display surface is provided beneath a transparent input surface in the tablet module, texts and drawings produced from handwritten characters can be generated and supplied to the control unit. The transparent input surface is operable by use of an instrument for actuating sensor elements in the transparent input surface; for example, where the sensor elements are triggered by pressure, a pressure-producing instrument such as a pen can be used which does not discharge a writing substance. In this case, the coordinates of the tip of the pressure-producing instrument are transmitted electronically in rapid sequence to the display unit disposed, resulting in a display of the written and/or drawn track at the same pace as the special pen. The handwritten texts and drawings can be corrected and edited, for example by partial erasure and overwriting, by displacement of text, or by insertion of text. Suitable key fields appear on the display unit for the input and editing of printed texts, for the performance of calculations, and for the input of programs.

If the arrangement includes a character recognition device which converts the handwritten character input into corresponding standard characters, these characters can be displayed on an associated display unit.

The invention will be described in greater detail below with reference to an embodiment that is illustrated in the drawings.

BRIEF DESCRIPTION OF THE DRAWINGS

FIG. 1, is a perspective view of an input unit according to the invention.

FIG. 2 is a perspective view of the input unit of FIG. 1 with the keyboard in its opened position.

FIG. 3 is a perspective view, partially broken away, of another embodiment of an input unit having a calculator field with its calculator keyboard in its opened position.

FIG. 4 is a perspective view, partially broken away, of a portion of an input surface which includes a cursor control device.

FIG. 5 is a perspective view, partially broken away, of a portion of an input surface which includes another embodiment of a cursor control device.

FIG. 6 is a perspective view schematically representing the layered structure of the sensor device of the keyboard tablet.

FIG. 7 is a schematic illustration of the interconnection of components to form a system according to an embodiment of the invention.

DETAILED DESCRIPTION OF THE PREFERRED EMBODIMENT

FIG. 1 shows an exemplary unit 100 which can be used by an operator for the input of information in the form of characters and/or graphic patterns to produce output information usable by an electronic data processing system. The unit 100 includes a keyboard tablet 1 and a graphics tablet 2. The unit 100 is in its folded position in FIG. 1, in which the keyboard tablet 1 is operable. The keyboard tablet 1 has a conventional typewriter keyboard arrangement such as is used in office typewriters, and includes a plurality of movable typing keys 3 as well as a plurality of additional function keys 4. Each of the typing keys 3 and the additional function keys 4 of the keyboard 1 include a key plunger 5. Each of the key plungers 5, as seen in FIG. 2, projects through the keyboard 1 and is visible when the unit 100 is in its open position.

The keyboard tablet 1 is pivotably connected to the graphics tablet 2 by a pair of hinges 6 and 7. The graphics tablet 2 has an input surface 9 which, as shown in FIGS. 2 and 6, includes a plurality of sensor elements 60, with each of the sensor elements 60 corresponding to respective pixel elements in a display which is described further hereunder.

In the folded position of the unit 100 as shown in FIG. 1, the key plungers 5 are spaced (when not depressed) from the input surface 9 due to the presence of a plurality of spacer elements 8 which are disposed on the underside 10 of the key tablet 1. The key plungers 5 may be elastic, rigid, hollow, or solid, depending on the tablet technology employed, and may further include, for example, caps (not shown) that can be pushed onto the respective ends of the key plungers 5. Depending on the resolution of the graphics tablet 2, which is determined by the size of the pixel elements, each key plunger 5 when depressed can contact a predetermined number of pixel elements disposed on the input surface 9 when the unit 100 is in its folded position, the folded position corresponding to keyboard mode of operation of the unit 100. This arrangement results in a high accuracy of detection of the individual keys depressed, since each key plunger 5 when depressed contacts its respective predetermined group of pixel elements. In this arrangement, a plurality of conductive paths (which correspond to each respective predetermined group of pixel elements) are thereby addressed by depression of each respective one of the keys 3 and the keys 4 when the unit 100 is used in its keyboard mode, and these conductive paths are interrogated by the electronic data processing system in known manner, as shown in U.S. Pat. Nos. 4,567,480, 4,353,552, 4,622,437, and 4,186,392, discussed hereinabove.

The graphics tablet 2 is composed, for example, of two superposed layers 11 and 12 which are mechanically and electrically connected to form a sensor device 50 having an input surface 9 and a plurality of sensor elements 60. The uppermost layer 11 in a preferred embodiment is configured as a transparent input unit having the input surface 9 on its uppermost surface. The input surface 9 is composed, for example, of a foil contact matrix equipped with finely distributed sensor elements 60 which can be formed by contact strips, as schematically illustrated in FIG. 6. It is also possible to employ in the graphics tablet 2 any of a plurality of different known sensor devices which can be used as coordinate input devices. Examples of such known sensor devices include, for example, those employing electromagnetic induction systems, electrostatic capacitance systems, transparent electrode systems, and optical detection systems.

The sensor device 50 shown in FIG. 6 is used to detect the X and Y coordinates of input points which in a preferred embodiment are provided by application of pressure using an instrument 16 or other suitable object. The input surface 9 includes a first group of electrodes 14 which are parallel to one another and a second group of electrodes 15 which are disposed generally transversely to the first group of electrodes 14 and which, upon application of pressure thereto (e.g., by the instrument 16), are adapted to resiliently deform toward the respective ones of the first group of electrodes 14 for making electrical contact therewith, the electrodes 14 and 15 being arranged in a grid pattern. When letters and/or figures are drawn on the input surface 9 using the instrument 16, the resulting pressure causes electrical contact to be established between the respective associated intersecting pairs of electrodes of the first and second groups of electrodes 14 and 15, along the path traced by the instrument 16. The coordinates of the path traced by the instrument 16 are then determined by use of a pair of coders 17 and 18 (schematically shown in FIG. 6), which are disposed on the sheet 11 and connected respectively to the electrodes 14 and 15. The coders 17 and 18 can vary according to the specific sensor elements 60 which are chosen for the input surface 9, and examples of suitable coder structures are shown in the prior art discussed hereinabove.

The sheet 12 carries plurality of display elements 70 which are actuated by appropriate signals from a pair of coders 19 and 20. The path traced by the instrument 16 is displayed by the display elements 70 as a corresponding writing track on the sheet 12 by the pair of coders 19 and 20. The display elements 70 can be LEDs, LCDs, electro-luminescent elements, or other devices having optically changeable characteristics. The coders 19 and 20 can be chosen according to the specific display chosen for the sheet 12, and examples of suitable structures for these coders are shown in the prior art discussed hereinabove.

The layer 13 in a preferred embodiment is a control unit which can include one or more microcomputers, memories, electronic circuits, and batteries. If both of the layers 11 and 12 are transparent, the layer 12 of the sensor device 50 can function as a display unit as discussed hereinabove (for example, having an LCD or LED display, or other suitable display means) which is integrated in the keyboard tablet 1. Alternatively, a monitor such as the monitor 36 of FIG. 7 can be used to display the path traced by the instrument 16.

The operating principle of the sensor device 50 is that the pressure tracks or pressure points produced by the instrument 16 or by a finger tip on the input surface 9 are converted into electrical signals by the sensor elements 60 included in the sensor surface 9. The path traced, e.g. the respective script, drawn line or characters selected, produced for example by the instrument 16, is displayed on a display unit (i.e., the layer 12 of FIG. 6 or, alternatively, the screen 36 of FIG. 7) according to the coordinates derived from the sensed signals by the electronic data processing system. Additionally, the electrical signals corresponding to the path traced or characters read, can be intermediately stored in a memory device (not shown) in the control unit for further processing for certain applications. In the arrangement shown in FIG. 1, the control unit operates in the keyboard mode, i.e. if the typing keys 3 or the function keys 4 are actuated, the key plungers 5 activate respective groups of sensor elements 60 in the input surface 9 The resulting signals from the sensor elements 60 are used by a suitable program in the control unit to generate the corresponding keyboard characters on a display (such as the layer 12 of FIG. 6 or the screen 36 of FIG. 7), or upon another type of record carrier, such as paper. Such control units, memory devices, and programs are known in the prior art, and examples of suitable structures for these system components are shown in the prior art discussed hereinabove.

In FIG. 2, the unit 100 is in its open position, corresponding to a graphics mode. As compared to FIG. 1, the key tablet 1 of FIG. 2 has been pivoted counter-clockwise relative to the graphics tablet 2 about the hinges 6 and 7. This pivoting or opening action, which exposes the input surface 9 of graphics tablet 2, activates an operating mode switch 21 (which can be a pressure switch operated by the opening or closing of the unit 100) which is disposed on the graphics tablet 2 next to the input surface 9. The switching or activation of the operating mode switch 21 as the unit 100 is opened signals the control unit to automatically switch the unit 100 from the keyboard mode to the graphics mode. In the open functional position of the unit 100 shown in FIG. 2, any desired pressure traces or pressure points can be produced on the input surface 9, for example by use of the instrument 16 or a finger tip, thereby triggering the sensor elements of the input surface 9 to produce electrical signals for the generation of handwritten characters and/or graphic patterns on the display unit (e.g., the layer 12 or the screen 36). In this operating mode, editing functions such as erasing, correcting, inserting and shifting of parts of the input text or drawings can also be performed using the keys 3 and 4, in accordance with the text and graphics processing program selected. The handwritten text and drawings input to the control unit by the instrument 16 are stored in the memory of the unit 100.

It is also possible to perform editing of the input text or drawings when in the graphics mode (corresponding to the open position of the unit 100), using the input surface 9 directly, as explained hereunder. The text which can be edited includes that which is stored in the form of printed characters and which are displayed on the display unit, and the editing operations can be performed using the instrument 16 or a finger tip directly on the input surface 9 to touch appropriate areas which are indicated on the graphics tablet 2 in a manner as discussed hereunder. An operating mode switch 22 is provided which is disposed near the input surface 9 on the graphics tablet 2. This operating mode switch 22 according to a preferred embodiment is actuable to cause switching of the unit 100 back from the graphics mode to the keyboard mode while simultaneously causing the control unit 13 to cause the layer 12 (which in this embodiment serves a the display device) to generate thereon a reproduction of the arrangement of the keys 3 and 4 of the keyboard tablet 1. For correction or erasure of text, the indicia corresponding to the selected keys can be depressed (using the finger tips, for example) to actuate the corresponding group of sensor elements on the surface 9 to provide electrical signals, which in turn cause the program operating in the control unit to trigger the chosen functions.

If the unit 100 does not include display unit beneath the input surface 9, a simulated keyboard 23 (shown in FIG. 2) can be provided as an overlay on the input surface 9, the simulated keyboard 23 having indicia which corresponds to a chosen typewriter keyboard. It is, however, also possible within the scope of the present invention to provide the input surface 9 itself with a keyboard simulation by printing the keys corresponding to a chosen keyboard arrangement, including for example that of the key tablet 1. At the same time, a grid, for example one having a sensor element grid with sensor elements spaced apart by distances of several millimeters, can in one embodiment be printed as an overlay. Alternatively, this grid can in another embodiment be printed directly on the input surface 9 in a different color to facilitate the input of graphics by use of pixels which are approximately delimited by the grid.

Additionally, the input surface 9 may be provided with exchangeable templates which are optically adapted to correspond to displays used with various selected software packages.

In the embodiment illustrated in FIG. 3, a unit 110 includes a typewriter key field 24 and a second key field 25 which is configured to correspond to the keyboard of a calculator and/or a function keyboard. In this embodiment, both the typewriter key field 24 and the second key field 25 are separately pivotable with respect to the graphics tablet 2, i.e. the second key field 25 and the key field 24 can selectively be separately pivoted to an open position or remain in an operational or closed position. In FIG. 3, the key field 25 is disposed in an open position, thereby exposing an input surface 26 disposed on the graphics tablet 2. An operating mode switch 27 is disposed next to the input surface 26. The operating mode switch 27 is actuated by opening of the key field 25 of the unit 110 to trigger automatic switching from the calculator keyboard mode to the graphics mode. The input surface 26, which is exposed by the opening of the key field 25, can be used to input handwritten and/or graphic characters or patterns. The input surface 26 can also be provided with cursor control devices as shown in FIGS. 4 and 5, which are discussed further hereunder.

As shown in FIG. 4, a cursor control device 34 is provided with a plurality of grooved depressions 28 which serve as a guide for cursor control, and which are also suitable for blind input. In another embodiment as shown in FIG. 5, a cursor control device 33 includes a group of cursor control keys 29, which may be reproduced as an image on the input surface 26 and which can then be used as sensor keys. However, it is also possible in another embodiment to employ the entire input surface 26 for cursor control, in which case the input surface 26 simulates at least a portion of a display unit. Also, the input surface 26 can be provided with a reproduction of the keys of the key field 25 (e.g., calculator keys) in the form of an imprint on the input surface 26.

FIG. 7 is a schematic illustration of a suitable interconnection of components to form a system according to an embodiment of the invention. The keyboard tablet 1 is connected to a microcomputer 30 by an encoder 31. The cursor control devices 33 and 34 are connected to the microcomputer 30 by an encoder 32. The microcomputer 30 includes a cursor register 35 which retains that portion of a screen 36 in which a character is shown that has been previously input by keyboard tablet 1 (this is used, for example, to move the cursor, which marks the next location to be occupied on the screen). By means of either one of the cursor control devices 33 and 34, the cursor can be selectively moved in permitted directions in steps across the screen 36. In this manner an operator can move the cursor to a location corresponding to that character position at which a correcting or supplementing input can be made via the keyboard tablet 1.

Additionally, the microcomputer 30 is connected to the input surfaces 9 and 26 which can be acted upon by the instrument 16. The instrument 16 in the embodiment of FIG. 7 is configured as a capacitive input element which has a tip 39 which is electrically insulated from its outer jacket 40. The tip 39 is connected via a cable 41 with an analog/digital (A/D) converter 37. The A/D converter 37 is connected with the microcomputer 30 via a flat cable 43. According to the embodiment of FIG. 7, the input surface 9 is configured as a resistance layer. When the tip 39 of the instrument 16 is placed onto the input surface 9, a partial voltage corresponding to the respective X and Y coordinates of the pen position is alternately applied to it. The A/D converter 37 digitizes this direct voltage and the microcomputer 30 recognizes whether the signal refers to an X or a Y coordinate value.

A switching member 42 is disposed on the instrument 16, and can be actuated by manipulation of the instrument 16. When actuated, the switching member 42 is connected to an evaluation circuit 38, which in one preferred embodiment is a Schmitt trigger, and which is likewise connected to the microcomputer 30 by a flat cable 44. When the evaluation circuit 38 is caused to switch due to the actuation of the switching member 42, the cursor controls 33 and 34 as well as the encoder 32 are separated from the cursor register 35, which then receives data from the converter 37 via the microcomputer 30. The switching member 42 may, for example, be an electromechanical touch switch disposed on the instrument 16.

The arrangement according to the invention is particularly suitable for use with intelligent work stations in the fields of word processing, office graphics, script and special character design, and logo design. The units 100 and 110 may include interchangeable special keyboards, and may include another type of graphics tablet which has as its contact element a anisotropic conductive foil disposed between two circuit boards (not shown).

Additionally, it is also easily possible to configure the keyboard tablet 1 as an independently functioning unit which then includes its own sensor elements or switching elements, thereby permitting elimination of a function switch for switching from the keyboard mode to the tablet mode. This configuration would be appropriate if, for example, the tablet technology employed would otherwise incur excessive costs for the key plungers.

The present disclosure relates to the subject matter disclosed in German Application No. P 37 32 519.1 of Sept. 26th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. An apparatus for the selective input of characters and graphic patterns for processing in an electronic data processing system, comprising:
   a graphics tablet having an input layer, and a plurality of sensor elements disposed on said input layer which are each actuable to produce electrical signals corresponding to the location of the respective actuated sensor element;
   a keyboard which is movable relative to said graphics tablet to a keyboard operating position for keyboard entry of characters and to a second operating position to permit direct entry of information to said input layer, said keyboard having a plurality of movable keys, in said keyboard operating position, each of said movable keys overlying a corresponding predetermined group of sensor elements; and
   operating mode detecting means for detecting whether said keyboard is in said keyboard operating position or in said second position for signalling the data processing system to respectively interpret information from said graphics tablet either as characters corresponding to keys on said keyboard, or to graphic patterns corresponding to actuated ones of said plurality of sensor elements.

2. An apparatus as defined in claim 1, wherein said sensor elements are disposed in a matrix pattern and are actuable by pressure; and further comprising control means for receiving input signals from said keyboard and from said graphics tablet for producing output signals corresponding to selected alphanumeric characters or graphic data depending upon whether said keyboard is in said keyboard operating position.

3. An apparatus as defined in claim 1, wherein said keyboard is pivotably connected to said graphics tablet.

4. An apparatus for the selective input of characters and graphic patterns for processing in an electronic data processing system, comprising:
 a graphics tablet having an input layer, a plurality of sensor elements being disposed on said input layer which are each actuable to produce electrical signals corresponding to the location of the actuated sensor element;
 a keyboard which is movable relative to said graphics tablet to a keyboard operating position for keyboard entry of characters and to another operating position for direct entry of information to said input layer; and
 operating mode detecting means for detecting whether said keyboard is in said keyboard operating position, said operating mode detecting means including a switch which is automatically actuated when said keyboard tablet is moved to said keyboard operating position, thereby switching said graphics tablet from a tablet mode to a keyboard mode.

5. An apparatus as defined in claim 4, wherein said graphics tablet includes another operating mode detecting means which is actuable for enabling cursor control when said input layer is enabled.

6. An apparatus as defined in claim 5, wherein said graphics tablet further comprises a layer disposed on said input layer, said layer having a keyboard simulation disposed on a foil.

7. An apparatus as defined in claim 5, wherein a keyboard simulation is imprinted on said input layer 8. An apparatus as defined in claim 5, further comprising a display means for displaying a keyboard simulation, said display means being disposed beneath said input layer, and wherein said input layer comprises a transparent layer.

9. An apparatus as defined in claim 1, further comprising at least one exchangeable cover disposed on said input layer, said exchangeable cover being optically adapted for use with a selected software program.

10. An apparatus as defined in claim 1, wherein said keyboard has a first key field configured to correspond to a typewriter keyboard and a second key field configured to correspond to a keyboard of a calculator, said first and second key fields being separately pivotably connected to said keyboard such that pivoting of either of said first and second keyboards to an open position exposes said input layer of said graphics tablet.

11. An apparatus for the selective input of characters and graphic patterns for processing in an electronic data processing system, comprising:
 a graphics tablet having an input layer, and a plurality of sensor elements disposed on said input layer which are each actuable to produce electrical signals corresponding to the location of the actuated sensor element;
 a keyboard which is movable relative to said graphics tablet to a keyboard operating position for keyboard entry of characters and to another operating position for direct entry of information to said input layer; said keyboard having a first key field configured to correspond to a typewriter keyboard and a second key field configured to correspond to a keyboard of a calculator, said first and second key fields being separately pivotably connected to said keyboard such that pivoting of either of said first and second keyboards to an open position exposes said input layer of said graphics tablet;
 operating mode detecting means for detecting whether said keyboard is in said keyboard operating position; and
 a switch disposed adjacent to said input layer which is automatically actuated by movement of one of said first and second pivotable key fields to a closed position.

12. An apparatus as defined in claim 11, wherein said input layer of said graphics tablet further comprises a selectively actuable cursor control means for controlling movement of a cursor on a display means, said cursor control means being disposed beneath said calculator key field.

13. An apparatus as defined in claim 12, wherein said cursor control means includes indicia which are imprinted on said input layer.

14. An apparatus as defined in claim 12, wherein said cursor control means includes grooved depressions in the said input layer.

15. An apparatus as defined in claim 2, wherein said control means includes a means for storing test formed of characters and means responsive to said input unit for editing the stored text.

16. An apparatus as defined in claim 1, wherein said input layer includes a foil contact matrix, and wherein said keyboard has a plurality of keys, each key having a key plunger which is associated with said predetermined group of sensor elements which are actuated when said key plunger is depressed.

17. An apparatus as defined in claim 2, wherein the control means has a flat configuration and is disposed below said input layer, said control means further comprising a character recognition means which converts information detected by said input layer into corresponding standard data, and further comprising a display means for displaying said standard data.

18. An apparatus as defined in claim 2, wherein said graphics tablet further comprises a second layer underlying said input layer, said second layer having a plurality of controllable display elements which can be controlled to produce an image representing a keyboard when said keyboard and said graphics tablet are in said keyboard operating position, said input layer being transparent so that said image on said second layer is visible during actuation of sensor element of said input layer.

* * * * *